United States Patent [19]
Drott

[11] 4,362,225
[45] Dec. 7, 1982

[54] FRICTION LINING CARRIER MEMBER HAVING REPLACEABLE FRICTION LININGS

[75] Inventor: Peter Drott, Frankfurt am Main, Fed. Rep. of Germany

[73] Assignee: ITT Industries, Inc., New York, N.Y.

[21] Appl. No.: 205,134

[22] Filed: Nov. 10, 1980

[30] Foreign Application Priority Data

Nov. 26, 1979 [DE] Fed. Rep. of Germany ....... 2947537

[51] Int. Cl.³ .............................................. F16D 65/12
[52] U.S. Cl. ............................... 188/218 XL; 29/433; 188/73.2; 188/250 G; 192/70.13
[58] Field of Search .......... 188/244, 245, 246, 250 G, 188/218 XL, 73.2; 192/70.13, 107 R; 29/433

[56] References Cited

U.S. PATENT DOCUMENTS

| | | | |
|---|---|---|---|
| 1,452,609 | 4/1923 | Klocke | 192/107 X |
| 2,109,871 | 3/1938 | Thode | 188/234 |
| 2,236,311 | 3/1941 | Eksergian | 188/244 |
| 2,485,082 | 10/1949 | Bachman | 188/218 XL |
| 2,913,081 | 11/1959 | Rudisch | 192/107 R X |
| 3,381,355 | 5/1968 | Bixby | 29/433 X |
| 3,473,635 | 10/1969 | Krause | 192/107 R |
| 3,480,117 | 11/1969 | Agren et al. | 188/218 XL |
| 3,606,937 | 9/1971 | Falch et al. | 188/218 XL |
| 4,060,286 | 11/1977 | Boice | 29/433 X |

FOREIGN PATENT DOCUMENTS

| | | |
|---|---|---|
| 927905 | 5/1955 | Fed. Rep. of Germany . |
| 1221664 | 7/1966 | Fed. Rep. of Germany ...... 188/218 XL |
| 2100009 | 9/1971 | Fed. Rep. of Germany . |
| 2363427 | 6/1975 | Fed. Rep. of Germany ... 192/107 R |
| 1205580 | 8/1959 | France . |
| 2446962 | 9/1980 | France ............................... 188/244 |

Primary Examiner—George E. A. Halvosa
Attorney, Agent, or Firm—John T. O'Halloran; Alfred C. Hill

[57] ABSTRACT

A carrier member for replaceable friction linings for clutch-type disc brakes wherein the friction linings are guided and held radially relative to a brake disc by a positive engagement with grooves in an adjacent surface of the carrier member with the friction linings being supported in the circumferential direction relative to the disc by supporting elements connected to the carrier member. The supporting elements engage bores in the carrier member perpendicular to the adjacent surface and are held in their mounted position by a friction lining overlapping an edge of the adjacent supporting element.

14 Claims, 7 Drawing Figures

FRICTION LINING CARRIER MEMBER HAVING REPLACEABLE FRICTION LININGS

BACKGROUND OF THE INVENTION

The present invention relates to a friction lining carrier member having replaceable friction linings, in particular, for clutch-type disc brakes, with the friction linings moving axially in frictional engagement with a disc and being guided and held radially inwardly and outwardly in positive engagement by appropriate formations on the friction lining carrier member. The friction linings also being supported in the circumferential direction of the disc by supporting elements which are in force-transmitting connection with the friction lining carrier member.

A friction lining carrier member of this type is known from German Patent DE-OS 2,100,009. The friction lining carrier member is constructed as a circular segment having a dove-tailed groove arranged in the circumferential direction of the disc on the radially outwardly and radially inwardly edges of the circular segment so that a track-like guidance is established in the circumferential direction of the disc. Friction linings are positioned in this guidance, with an intermediate part disposed in the guidance located between the friction linings. The guidance is closed on both ends by clamping elements so that the friction linings are fixed in the circumferential direction of the disc as well.

Although this arrangement allows an easy replacement of the friction linings, the friction linings are subjected to different mechanical loads. When such an arrangement is brought into frictional engagement with a disc rotating in the main direction of rotation, the friction linings will transmit the friction forces occurring thereat onto that clamping element lying to the rear of the friction linings when looking in the main direction of rotation. Due to this, the friction element directly adjacent to the clamping element will have to transmit all friction forces of the friction linings inserted ahead of it, since the intermediate parts are not connected to the friction lining carrier member in the circumferential direction. Thus, the friction lining closest to the clamping element is required to transmit the entire amount of friction forces onto the clamping element. Due to this increased mechanical load, this friction lining is subjected to greater wear resulting in the friction volume available from the other linings not being permitted to be fully utilized. This disadvantage will be greater when more individual friction linings are arranged in a friction lining carrier member.

German Pat. DE-PS 927,905 shows a different arrangement of several friction linings on a friction lining carrier member. The friction linings are rigidly arranged on a backing plate, with the backing plate including mechanisms in the circumferential direction enabling the backing plate to be secured to fasteners on the friction lining carrier member. Each single fastening mechanism, however, has to be secured against detachment which considerably increases the expenditure needed for such an arrangement.

French Pat. No. 1,205,580 shows as an alternative arrangement where a circular disc is provided with friction linings rivoted or otherwise fastened thereto. Replacement of the linings is particularly time-consuming with an arrangement like this since several connections have to be removed and renewed.

SUMMARY OF THE INVENTION

It is an object of the present invention to provide a friction lining carrier member, in which the friction linings are held and supported in a guidance in such a manner that the friction linings are worn out substantially equally when loaded. The friction lining carrier member of the present invention also permits a simple and quick replacement of the friction linings without need for additional special tools.

A feature of the present invention is the provision of a friction lining carrier member having a plurality of replaceable friction linings comprising: the carrier member having a first formation on an inner portion thereof and a second formation on an outer portion thereof, each of the plurality of friction linings being guided in a circumferential direction between and in positive engagement radially with the first and second formations; and at least one supporting element disposed between each adjacent ones of the plurality of friction linings, the supporting elements being in a positive engagement with the carrier member and held in position in the carrier member by one of the adjacent ones of the plurality of friction linings. Such a supporting element may be easily detached and used several times. Thus, an extremely easy assembly of the friction linings in the friction lining carrier member is ensured which may be effected comparatively fast.

A favorable form of the supporting element is a round bolt member having a substantially rectangular head having a larger diameter than the bolt. Manufacturing technique requirements for such a supporting element may be easily met which results in comparatively low costs.

If the head includes a step on the side close to the friction lining and if the head is placed in a recess in the friction lining carrier member such that the step and the surface of the friction lining carrier member form one plane, the bolt member is able to be held in positive engagement by simply shifting the next friction lining against the supporting element. The friction lining will then be positioned on the step in such a manner as to be able to bear against the end face of the head close to itself. Provision of a force-receiving locking mechanism is thereby ensured for both directions of movement or directions of load on the friction linings.

The bolt member is preferably situated in a through-bore in the friction lining carrier member, thereby enabling the removal of the bolt member that may be stuck due to rusting or corroding by a punch.

The friction lining carrier member is most favorably constructed in the form of a circular ring, the inner and the outer rim of which having circumferential grooves facing each other. Thus, a simple guidance for the friction linings is made available. The simplest form is provided by the grooves being of dove-tailed cross section.

For ease of assembling the friction linings, the outer or the inner groove includes a gap whose width corresponds to at least the width of a friction lining. This enables assembly of the friction linings in the carrier member without difficulty. The gap is favorably closed by a clamping element completing the interrupted groove. This arrangement guarantees a safe mounting of each friction lining.

The clamping element is also easily detachable, since it is held to the friction lining carrier member by means of a clamping sleeve. An additional axial securing of clamping element is accomplished by the clamping element engaging axially in positive engagement with a radially outwardly extending groove in the friction lining carrier member.

The clamping element may be likewise fixed radially to the friction lining carrier member by means of the clamping sleeve. A particularly simple construction is provided by a cramp maintaining the clamping element in its position on the friction lining carrier member. A simple arrangement, which is detachable without need for special tools, for the cramp includes two pins in two bores of the clamping element, with the pins being received in bores of the friction lining carrier member.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

The example cited herein shows but one possibility of a friction lining carrier member appropriate for a clutch-type disc brake or for a clutch disc. The present invention is, however, also suitable for arrangements of spot-type disc brakes with a plurality of friction linings on one friction lining carrier member.

Figure 1:
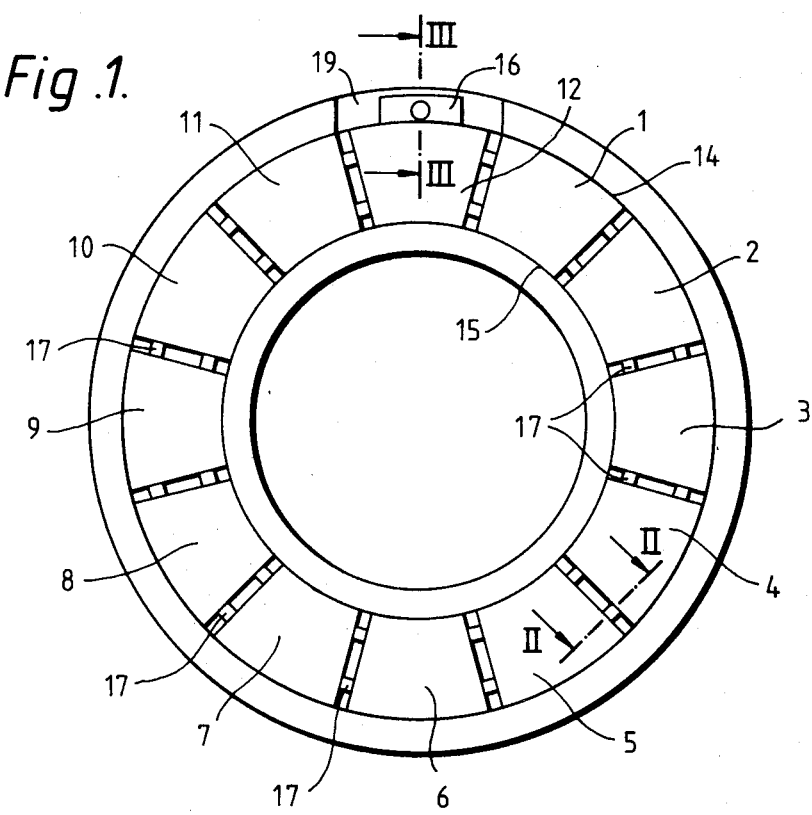
FIG. 1 is a top view of a friction lining carrier member for an internally expanding clutch-type disc brake in accordance with the principals of the present invention.

In FIG. 1, reference numerals 1 to 12 designate the replaceable friction linings. The friction lining carrier member 13, having the form of a circular ring, includes a groove 14 at its radially outer rim and a groove 15 at its radially inner rim. Grooves 14 and 15 face each other and are constructed, for instance, to have a dove-tailed cross section. A guidance is provided due to this structure, in which friction linings 1 to 12 are positioned. For this purpose, outer groove 14 has a gap 19, the length of which corresponds to at least the width of a friction lining. Gap 19 is closed by a clamping element 16 completing the outer groove 14 in gap 19. Located between friction linings 1 to 12 are the supporting elements 17 which are inserted in bores 18 of friction lining carrier member 13.

Figure 2:
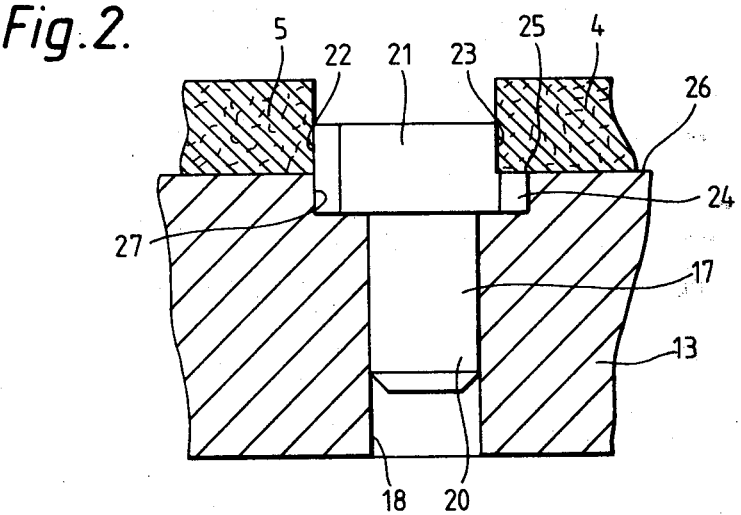
FIG. 2 is a cross sectional view taken along line II—II of FIG. 1.
Figure 4:
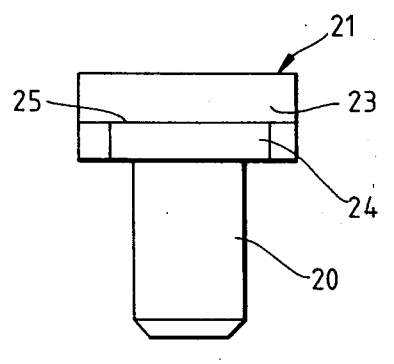
FIG. 4 is a side view of a supporting element.
Figure 5:
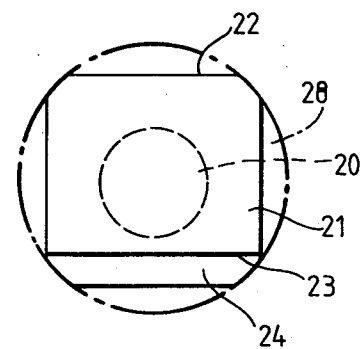
FIG. 5 is a top view of the supporting element of FIG. 4.

In FIG. 2, a supporting element 17 in friction lining carrier member 13 is shown in detail. Supporting element 17 is a round bolt 20 with a head 21 having a larger diameter than the bolt and constructed substantially rectangular as shown in FIGS. 4 and 5. Head 21 has a step 24 disposed in an end face close to friction lining 4. Bolt 20 is housed in a bore 18 terminating in an enlarged bore 27 at the end portion close to the friction linings. Enlarged bore 27 is constructed so as to receive a part of head 21 and such that step 24 will be positioned in enlarged bore 27 such that the surface 25 of step 24 forms one plane with the surface 26 of friction lining carrier member 13. The adjoining friction lining 4 will be moved up to the side 23 of head 21, thereby covering step 24 completely. Supporting element 17 is thus secured axially in its mounting position by the friction lining and is fixed in an operative connected relation in friction lining carrier member 13.

Figure 3:
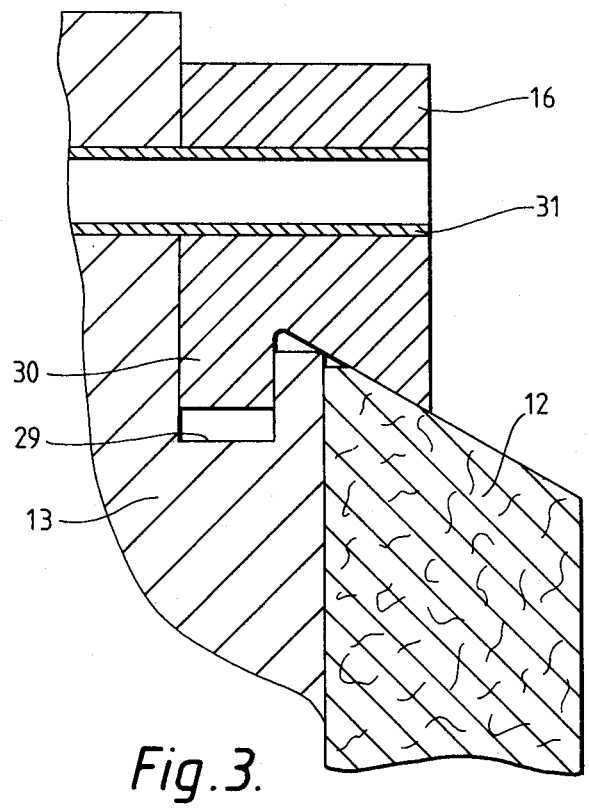
FIG. 3 is a cross sectional view of the clamping element taken along line III—III of FIG. 1.

The assembly of friction linings 1 to 12 in member 13 is carried out as follows, for example. A first friction lining 6 is positioned in gap 19 and moved up to the illustrated position in the guidance provided by grooves 14 and 15. On the right and on the left of friction lining 6, supporting elements 17 are inserted which will have their side faces 22 abut friction lining 6 directly and retain lining 6 in its position. Friction linings 5 and 7 may now be inserted through gap 19 moved up to side faces 23 of supporting elements 17 and will thus abut steps 24. The supporting elements 17 which support friction lining 6 in a circumferential direction are now axially secured in position. Friction linings 5 and 7 are, on their part, secured by additional supporting elements 17, these supporting elements 17 having abutting their side faces 22 abutting friction linings 5 and 7. In this manner, friction lining carrier member 13 is filled until friction linings 1 and 11 are secured, on their part, by supporting elements 17 lying on the right and on the left of gap 19. When friction lining 12 is inserted in gap 19, supporting elements 17 are secured in their axial position on the right and on the left of gap 19, since friction lining 12 will abut steps 24 of the four supporting elements 17. Gap 19 is closed by the clamping element 16 engaging—as shown in FIG. 3—with an extension 30 in a radially outwardly extending groove 29 of friction lining carrier member 13. Clamping element 16 is constructed relative to member 13 such that it embraces friction lining 12 at one rim thereof. The construction is chosen such that clamping element 16 completes outer groove 14 of member 13 and such that friction lining 12 as well as the other friction linings, is kept in its position on friction lining carrier member 13. Clamping element 16 is secured radially relative to member 13 by means of an inserted clamping sleeve 31. Friction lining carrier member 13 is now fully assembled and ready for operation.

When the linings are worn out, the friction linings are renewed without need for special tools by opening gap 19 and taking out friction linings 1 to 12 and supporting elements 17 individually. Since bores 18 in friction lining carrier member 13 are through-bores, it is possible to knock out supporting elements 17 which may be stuck due to rusting or corroding by means of a punch or the like.

FIGS. 4 and 5 illustrate a supporting element 17, whose manufacturing is particularly easy. As can be seen from FIG. 5, a supporting element 17 is in the form of a bolt with two portions 20 and 28 of different diameters. Portion 28 is machined to provide a substantially rectangular head 21. Step 24 is then obtained by a simple milling operation.

The illustrated form of friction lining carrier member 13 provides a simple and quick replacement of friction linings 1 to 12 resulting in a considerable shortening of the servicing time compared to the arrangements known in the prior art.

Since supporting elements 17 and clamping sleeve 31 can be used several times, a remarkable savings of material is obtained in addition to the saving of time.

Figure 6:
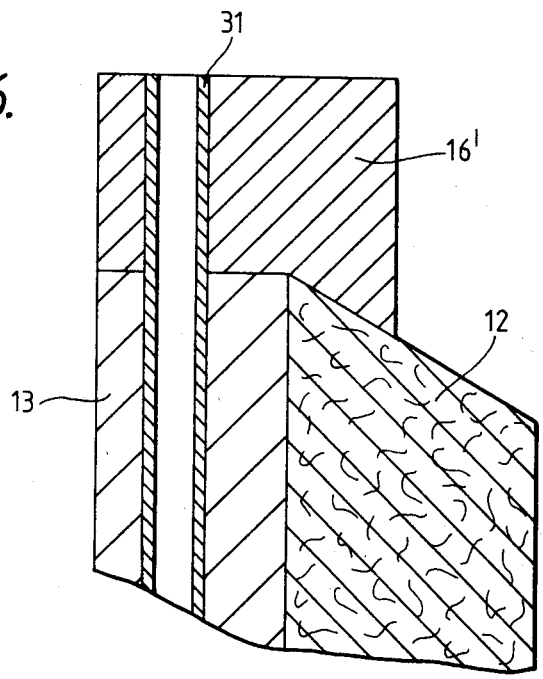
FIG. 6 is a cross sectional view through a clamping element with radial fastening.

In FIG. 6, a modified clamping element 16' with a radially arranged clamping sleeve 31 is shown. Groove 29 of FIG. 3 can be eliminated in this construction and clamping element 16' can be manufactured in a simpler way then element 16 of FIG. 3 and thus at lower cost because the necessity for extension 30 is eliminated which has to be machined very precisely.

Figure 7:
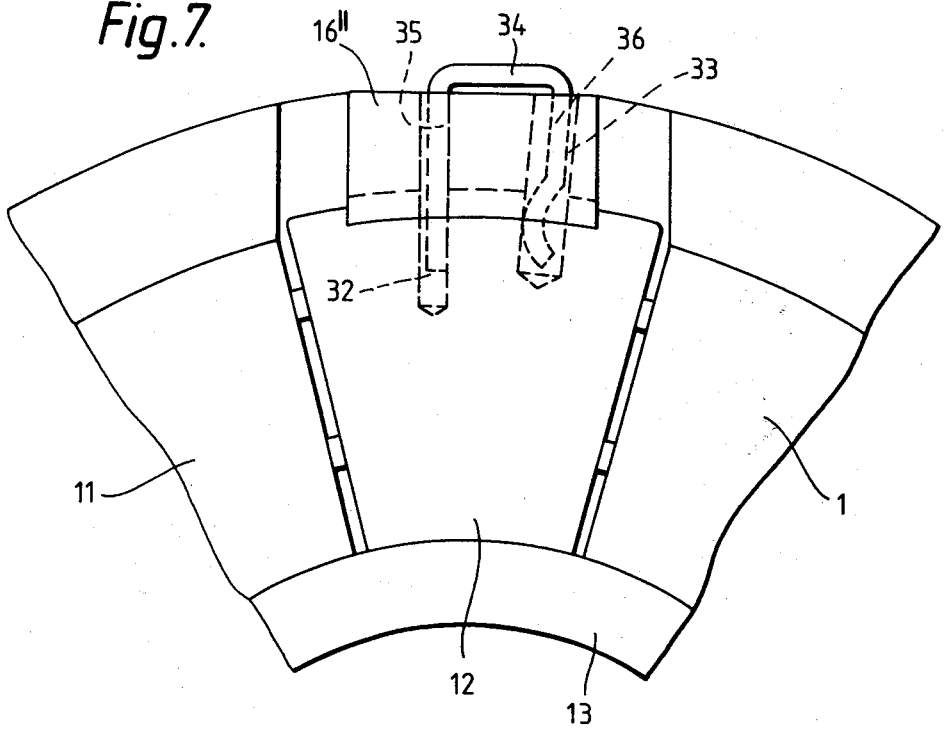
FIG. 7 illustrates a clamping element connected in its operative location.

Another clamping element is illustrated in FIG. 7. Clamping element 16" includes two bores 32 and 33 separated a given distance x in the circumferential direction and axially situated on the same level. Bores 32 and 33 continue into friction lining carrier member 13 and are aligned with the central point thereof, thereby forming an angle relative to each other. A resilient cramp 34 having two legs 35 and 36 have a given distance y separating each other are inserted in bores 32 and 33 deeply enough such that both legs 35 and 36 will be positioned in friction lining carrier member 13. Since the distance x of the bores is greater than the distance y, both legs 35 and 36 are operatively fixed in bores 32 and 33 and, hence, secure clamping element 16". Cramp 34 is secured radially as well, since the distance between the inlets of the two bores 32 and 33 is larger than the distance between the portion of the two bores 32 and 33 in member 13, and cramp 34 therefore, has to be bent upward when lining 12 is taken out radially.

While I have described above the principles of my invention in connection with specific apparatus it is to be clearly understood that this description is made only by way of example and not as a limitation to the scope of my invention as set forth in the objects thereof and in the accompanying claims.

I claim:

1. A friction lining carrier member having a plurality of replaceable friction linings comprising:

said carrier member having a first formation on an inner portion thereof and a second formation on an outer portion thereof, each of said plurality of friction linings being guided in a circumferential direction between and in positive engagement radially with said first and second formations; and at least one supporting element disposed between each adjacent ones of said plurality of friction linings, said supporting elements being in a positive engagement with said carrier member and held in position in said carrier member by one of said adjacent ones of said plurality of friction linings being in an overlapping relationship therewith;

each of said supporting elements being a round bolt having a substantially rectangular head larger than the diameter of a shank portion of said bolt, said shank portion being disposed in a bore in said carrier member, said head including a step on a side surface thereof adjacent to said one of said adjacent ones of said plurality of friction linings, said head being disposed in a recess in said carrier member such that said step and a surface of said carrier member supporting said plurality of friction linings are on the same plane, and said one of said adjacent ones of said plurality of friction linings being placed on said step in an abutting relation with a surface of said head perpendicular to said step.

2. A carrier member according to claim 1, wherein said bore extends through said carrier member.

3. A carrier member according to claim 1, wherein said carrier member is a circular ring, said first formation is a first circumferential groove disposed on an inner rim of said ring, and said second formation is a second circumferential groove disposed on an outer rim of said ring, said first and second grooves being disposed to face each other.

4. A carrier member according to claim 3, wherein said first and second grooves have a dove-tailed cross section.

5. A carrier member according to claim 3, wherein one of said first and second grooves has a gap therein having a width equal to at least the width of one of said plurality of friction linings.

6. A carrier member according to claim 5, wherein said gap is closed by a clamping element after said plurality of friction linings are assembled on said carrier member.

7. A carrier member according to claim 6, wherein said clamping element is removably secured to said carrier member by a clamping sleeve.

8. A carrier member according to claim 7, wherein said clamping sleeve extends through said clamping element into said carrier member.

9. A carrier member according to claim 6, wherein said clamping element has a projection thereon which is in positive engagement with a mating groove in said carrier member.

10. A carrier member according to claim 9, wherein said clamping element in removably secured to said carrier member by a clamping sleeve.

11. A carrier member according to claim 10, wherein said clamping sleeve extends through said clamping element into said carrier member.

12. A carrier member according to claim 6, wherein said clamping element is removably secured to said carrier member by a resilient cramp.

13. A carrier member according to claim 12, wherein said cramp includes two legs each extending into a different one of two bores extending through said clamping element into said carrier member, each of said two legs engaging an inner surface of the associated one of said two bores in said carrier member.

14. A carrier member according to claim 13, wherein each of said two bores extend toward the center of said circular ring and thereby said two bores are angled with respect to each other.

* * * * *